(12) United States Patent
Machewirth et al.

(10) Patent No.: US 6,912,342 B2
(45) Date of Patent: Jun. 28, 2005

(54) OPTICAL FIBER MODULE HAVING REDUCED MULTI-PATH INTERFERENCE

(75) Inventors: David P. Machewirth, Ellington, CT (US); Eric J. Mozdy, Elmira, NY (US); Rachel S. Mozdy, Elmira, NY (US); Daniel A. Nolan, Corning, NY (US); V Srikant, Evanston, IL (US); Sergey Y. Ten, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 207 days.

(21) Appl. No.: 10/328,553

(22) Filed: Dec. 19, 2002

(65) Prior Publication Data

US 2004/0120641 A1 Jun. 24, 2004

(51) Int. Cl.$^7$ ................................................. G02B 6/26
(52) U.S. Cl. .............................. 385/29; 385/28; 385/32
(58) Field of Search ............................... 385/28, 29, 32

(56) References Cited

U.S. PATENT DOCUMENTS

| | | | | |
|---|---|---|---|---|
| 4,270,839 A | * | 6/1981 | Cross | 385/32 |
| 5,259,045 A | * | 11/1993 | Azuma et al. | 385/4 |
| 6,278,816 B1 | | 8/2001 | Keur et al. | 385/29 |
| 2003/0142940 A1 | * | 7/2003 | Qi et al. | 385/127 |

FOREIGN PATENT DOCUMENTS

| WO | WO 97/39460 | 10/1997 | ............ H01C/3/06 |
|---|---|---|---|

OTHER PUBLICATIONS

M. Yadlowsky, et al., "Experimental comparison of the effect of discrete and distributed path inband crosstalk on system performance: application to predicting system performance penalties," IEEE Journal of Lightwave Technology, vol. 16, No. 10, p. 1813–1821, 1998.

E. Goldstein, et al., "Performance implications of component crosstalk in transparent lightwave networks," IEEE Photonics Technology Letters, vol. 6, No. 5, p. 657–660, 1994.

S. Heckman, "Modal noise in single–mode fibers operated slightly above cutoff" Electronics Letters, vol. 17, p. 499–500, 1981.

D. Marcuse, "Field deformation and loss caused by curvature of optical fibers," J. Opt. Soc. Am., vol. 66, No. 4, p. 311–320, 1976.

XP002279385, Mahlke, G. "Fiber Optic Cables", 1986, John Wiley, Berlin/Germany, p. 237, paragraphs Mode, Filters.

XP–002279386, Allard, C.F. "Fiber Optics Handbook", McGraw Hill, New York, p. 4.15; figure 4.19B.

* cited by examiner

*Primary Examiner*—John D. Lee
*Assistant Examiner*—Jennifer Doan
(74) *Attorney, Agent, or Firm*—Kevin M. Able

(57) ABSTRACT

Disclosed is a fiber optic module containing one or more optical fibers having an attenuator formed in the output end of the fibers to filter out unwanted higher order modes. The optical fibers are typically gain fibers or dispersion compensating fibers, and the attenuator consists of a coil, or a series of bends, of sufficient number and bend radius that higher order modes are reduced below a desired level.

14 Claims, 6 Drawing Sheets

OPTICAL FIBER MODULE HAVING REDUCED MULTI-PATH INTERFERENCE

BACKGROUND OF THE INVENTION

1. Field of the Invention

The present invention relates to optical fiber modules such as dispersion compensation or amplifier modules, in particular such modules which have reduced multi-path interference.

2. Technical Background

The continued build-out of fiber optic telecommunications infrastructures has spawned a vast array of fiber optic components designed to modify, condition, or route the transmitted signal. Such components include optical fiber couplers, optical fiber amplifiers, and dispersion compensating modules. Typically, these components are in the form of modules. That is, the component is contained in an enclosure, or box, and is inserted into a fiber optic transmission line as a discrete device. Such modules may themselves be composed of one or more smaller modules, or sub-units.

Fiber optic modules often contain a specialty fiber that performs all or a portion of the function of the module. In the case of optical fiber amplifiers and dispersion compensating modules, these specialty fibers are gain fibers and dispersion compensating fibers, respectively. Gain fibers and dispersion compensating fibers may be contained in the largest unit of the module, or the specialty fiber may be contained in a smaller module, or sub-unit. Often the specialty fiber is many meters long. To facilitate placement in the module containing it, the fiber is typically held in a coiled configuration.

To minimize optical loss, the module containing the specialty fiber is typically fusion spliced into the optical path to reduce optical loss at the splice point. That is, the input end and the output end of the specialty fiber are fusion spliced to other fibers. Such other fibers may be transmission fibers, or they may be pigtails connected to other fiber optic devices such as, for example, semiconductor lasers. Less often, mechanical splices may be used. In either case, however, an interface is created between the input or output end of the specialty fiber, and the other fiber or component to which it has been mated.

Optical fiber amplifiers consist of an optical gain fiber with a core containing one or more optical gain dopants such as rare earth ions. The gain fiber may be contained within the amplifier enclosure only, or it may be a part of a smaller module contained within the amplifier enclosure. In operation, the amplifier receives an optical signal of wavelength $\lambda_s$ and pump power of wavelength $\lambda_p$ which are combined by means such as one or more pump/signal wavelength division multiplexer (WDM) couplers located at one or both ends of the amplifier.

A key characteristic of a fiber optic amplifier is its noise figure, which is the ratio of the signal-to-noise ratio at the amplifier input to the signal-to-noise ratio at the amplifier output. The noise figure characterizes the amount of noise the fiber amplifier adds to the signal $\lambda_s$. The signal $\lambda_s$ is input to the amplifier and follows a primary signal path to the amplifier output. The signal light that follows the primary signal path is hereinafter referred to as the primary signal light. Fundamental unavoidable noise is generated in the primary signal light by spontaneous emission produced by the gain fiber. The spontaneous emission noise gives rise to a minimum noise figure. Excess noise is generated in the amplifier when a portion of the primary signal light follows a secondary path and arrives at the output at some time delay relative to the signal light in the primary path, thereby generating one or more secondary signals that may interfere with the primary signal. Such interference is termed multi-path interference (MPI). MPI may form as a result of multiple reflections of the primary signal light within the amplifier, coupling of the primary signal light to higher order modes, scattering of the primary signal light from discrete or distributed sites within the optical fiber, or even four wave mixing. More specifically, MPI results when a delayed secondary signal is re-coupled into the original primary signal. When re-coupling occurs, the total optical intensity can be described by, $$I \propto E_1^2 + E_2^2 + E_1^2 E_2^2 \cos([\omega_1 - \omega_2]t + [\phi_1(t) - \phi_2(t)])$$

where $E_1$ and $E_2$ are the field amplitudes of the primary and delayed secondary signal, respectively. The oscillatory term in the above equation, that is the term containing the cosine function, is the root of MPI, and time-dependent differences between the frequencies $\omega$ or the phases $\phi$ result in receiver noise. Coherent crosstalk occurs when the path delay is within the coherence time of the transmission laser, implying that $\omega_1 = \omega_2$. In the case of coherent crosstalk, noise is driven only by phase difference, resulting both from the output characteristics of the transmission lasers as well as the environmentally-dependent phase relationships of the separate optical paths. Alternatively, incoherent crosstalk results when the path delay incurred by the secondary path is longer than the coherence time of the laser, in which case the recombined signal may contain variations due to both frequency and phase fluctuations.

The gain fiber of an optical fiber amplifier has an input end and an output end, and typically the length of gain fiber is formed into a coil to facilitate placement of the fiber within the amplifier, or module enclosure. The input end and the output end of the gain fiber may be connected to other components within the optical amplifier or module, such as, for example, optical coupler pigtails, or one or both ends of the gain fiber may be connected to other fibers. Connection of the gain fiber is usually made by fusion splicing the input and output ends of the gain fiber to the fiber pigtail of another amplifier component or to a transmission fiber. One particular source of MPI occurs when signal light is perturbed by the splice point at the input end of the amplifier gain fiber. The primary signal light that is input into the gain fiber may be perturbed sufficiently that some power is coupled out of the fundamental mode of the primary signal light into higher order modes. By fundamental mode we mean the LP01 mode. By higher order modes we mean modes other than the fundamental mode. Primary signal light that is coupled into higher order modes at the splice point at the input end of the gain fiber, hereinafter referred to as the secondary signal light, may be re-coupled into the fundamental mode of the primary signal light by a perturbation at the splice point at the output end of the amplifier gain fiber. The coupled secondary signal light can interfere with the primary signal light and thereby create noise. If the secondary signal light can be prevented from re-coupling into the fundamental mode of the primary signal light, the source of MPI within the amplifier resulting from the re-coupling of optical power from higher order modes, generally termed modal interference, can be eliminated, and the amplifier noise figure can be significantly reduced.

Modal interference is also of concern in the design and operation of other fiber optic modules, including, for example, dispersion compensating modules. Similar to the case of optical amplifiers, the dispersion compensating fiber module contains at least a dispersion compensating fiber. The dispersion compensating fiber has an input end and an output end, and the length of dispersion compensating fiber is typically wound into a first coil to facilitate placement within the module enclosure. The dispersion compensating fiber may be connected to other components within the module, or the compensating fiber may be connected to one or more transmission fibers. Such connections are typically made by fusion splicing the dispersion compensating fiber to the component pigtail or to the transmission fiber. As in the case of optical amplifiers described above, in a dispersion compensating module primary signal light perturbed at the splice point at the input end of the dispersion compensating fiber can be coupled to higher order modes and propagate within the dispersion compensating fiber as secondary signal light. The secondary signal light propagating in the higher order modes may then be re-coupled into the fundamental mode of the primary signal light at the splice point at the output end of the dispersion compensating fiber resulting in interference noise.

As the design of fiber optic modules containing such specialty fiber as, for example, amplifier gain fiber and dispersion compensating fiber, advances, designers seek increasing flexibility for the design of these fibers. For example, one goal of dispersion compensating fiber design involves utilizing larger negative total dispersion accompanied by dispersion slope properties tailored to particular transmission fibers. Several approaches for increased negative dispersion involve setting the fiber cutoff wavelength of the dispersion compensating fiber at a sufficiently high wavelength that the dispersion compensating fiber operates in a multimoded state, thereby allowing the fiber designer to tailor the dispersion of the fundamental mode of the primary signal light without significantly impacting other fiber attributes. In a similar manner, the ability to operate in a multimoded fashion along the length of an amplifier gain fiber presents the fiber and component designer with increased design options. Unfortunately, the presence of multiple strongly-guided modes can potentially cause large levels of modal interference. It would therefore be beneficial if a means of minimizing the presence of modal interference in fiber optic modules could be found.

SUMMARY OF THE INVENTION

The present invention is related to an optical fiber module including at least one optical fiber, wherein the at least one optical fiber has an input end, an output end, a first coil and a bending means for attenuating higher order modes formed in at least the output end of the at least one optical fiber, and wherein the bending means is separate from the first coil.

In one embodiment of the invention the optical fiber module is an optical fiber amplifier module. The optical fiber amplifier module includes an amplifier gain fiber having an input end and an output end. The length of gain fiber may be formed into a first coil to facilitate placement within the module enclosure. Pump power of wavelength $\lambda_p$ is coupled from an optical signal source to one end of the amplifier gain fiber either directly or through other components or sub-units. An input means introduces a primary optical signal of wavelength $\lambda_s$ into the input end of the amplifier fiber either directly or through other components or sub-units. The introduced primary signal traverses a preferred, designated path through the amplifier gain fiber, whereby an amplified primary signal light of wavelength $\lambda_s$ appears at the output end of the gain fiber. Perturbation of the primary signal light at the splice point at the input end of the gain fiber may result in a portion of the primary signal light being coupled out of the fundamental mode of the primary signal light into higher order modes as secondary signal light. The secondary signal light traverses a secondary path through the gain fiber having a path length that introduces a time delay in the secondary signal light relative to the primary signal light. The secondary signal light may subsequently be sufficiently perturbed at the splice point at the output end of the gain fiber to cause the delayed secondary signal light to re-couple into the fundamental mode of the primary signal light. That portion of the secondary signal light traversing the secondary path that is re-coupled into the fundamental mode of the primary signal light would, if unattenuated, interfere with the primary signal light. In accordance with the present invention, bending means are provided for at the output end of the gain fiber, after the first coil and before the splice point at the output end of the gain fiber, for attenuating that portion of the secondary signal light that would otherwise be re-coupled into the fundamental mode of the primary signal light at the splice point at the output end of the gain fiber. A preferred bending means is a series of bends of less than 360° formed in the optical amplifier gain fiber after the first coil and before the splice at the output of the optical amplifier gain fiber. More preferably, the bending means is an attenuating second coil formed in the optical amplifier gain fiber after the first coil and before the splice at the output of the optical amplifier gain fiber.

In another embodiment of the invention, the optical fiber module is a dispersion compensating module. The dispersion compensating module includes a dispersion compensating fiber having an input end and an output end. The length of dispersion compensating fiber may be formed into a first coil to facilitate placement in the module enclosure. The dispersion compensating fiber is connected to other components, subunits, or transmission fiber by a splice point at each of the input and output ends of the dispersion compensating fiber. An input means introduces a primary optical signal light of wavelength $\lambda_s$ into the input end of the dispersion compensating fiber either directly or through other components or subunits. The introduced signal traverses a preferred, designated path through the dispersion compensating fiber whereby the primary signal light of wavelength $\lambda_s$ appears at the output end of the dispersion compensating fiber. Perturbation of the primary signal light at the splice point at the input end of the dispersion compensating fiber may result in a portion of the primary signal light being coupled into higher order modes where it propagates as a secondary signal light. The secondary signal light traverses a secondary path through the dispersion compensating fiber that introduces a time delay into the secondary signal light relative to the primary signal light. The secondary signal light may be sufficiently perturbed at the splice point at the output end of the dispersion compensating fiber to re-couple the secondary signal light into the fundamental mode of the primary signal light. That portion of the secondary signal light traversing the secondary path that is re-coupled into the fundamental mode of the primary signal light would, if unattenuated, interfere with the primary signal light. In accordance with the present invention, bending means are provided for at the output end of the dispersion compensating fiber, after the first coil and before the splice point at the output end of the dispersion compensating fiber, for attenuating that portion of the secondary signal light that might otherwise re-couple into the primary signal light the output end of the dispersion compensating fiber. A preferred bending means is a series of bends of less than 360° formed in the dispersion compensating fiber after the first coil and before the splice at the output of dispersion compensating fiber. More preferably, the bending means is an attenuating second coil formed in the dispersion compensating fiber after the first coil and before the splice at the output of the dispersion compensating fiber.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
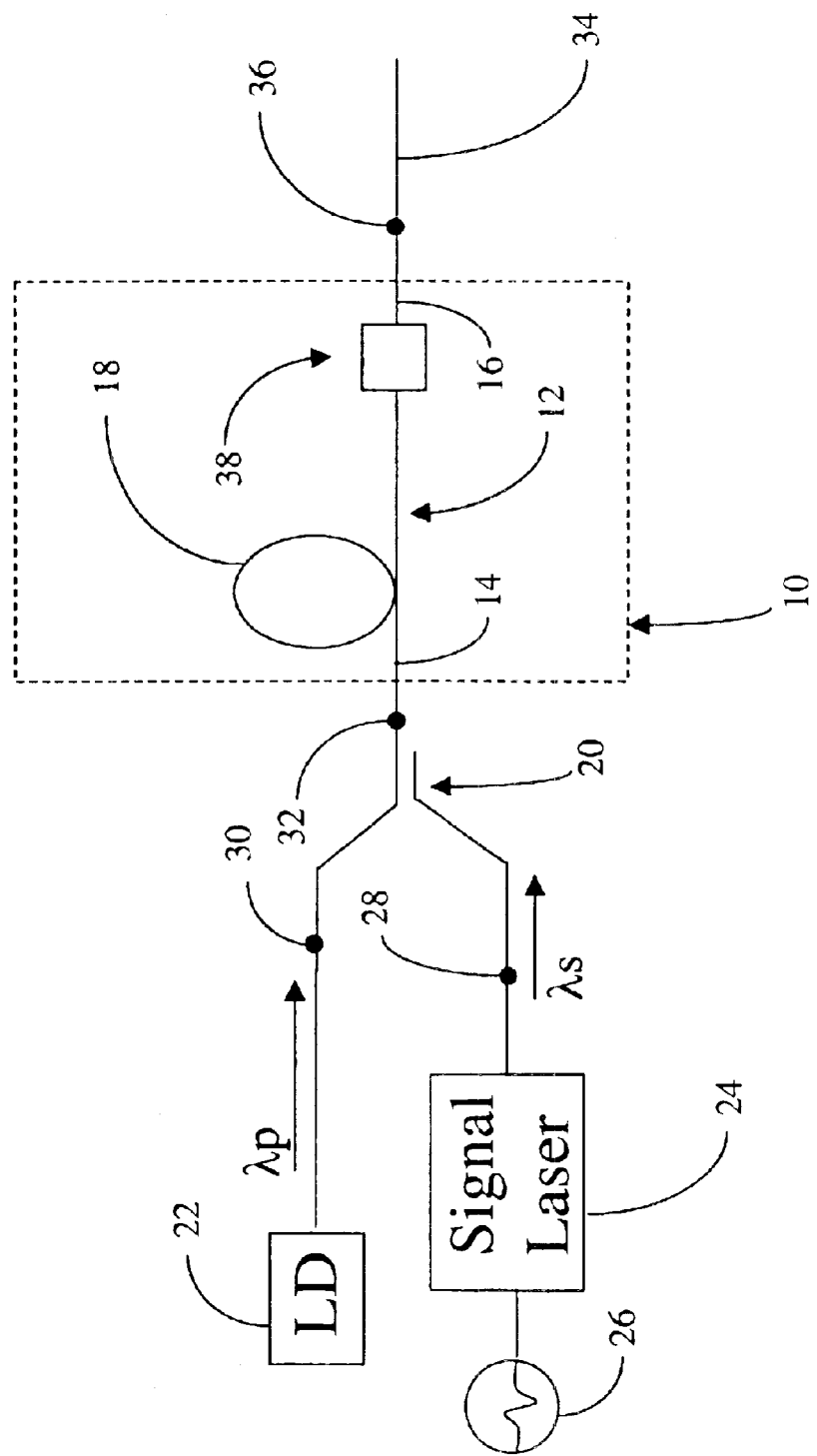
FIG. 1 is an illustration of one embodiment of the present invention showing the arrangement of the attenuating means in a single-stage optical amplifier.

Reference will now be made in detail to the present preferred embodiments of the invention, examples of which are illustrated in the accompanying drawings. Whenever possible, the same reference numerals will be used throughout the drawings to refer to the same or like parts.

Optical fiber amplifiers typically include an optical fiber module 10 containing at least one optical gain fiber 12 (FIG. 1). The core of the gain fiber is doped with gain ions that are capable of producing stimulated emission of light within a predetermined band of wavelengths including a wavelength $\lambda_s$ when pumped with light of wavelength $\lambda_p$ that is outside the predetermined band. The gain fiber has an input end 14 and an output end 16. The gain fiber length is typically formed into a first coil 18 to facilitate placement of the gain fiber in the module or amplifier enclosure. A WDM fiber optic coupler 20 can be used for coupling pump: energy of wavelength $\lambda_p$ from laser diode 22 and the primary signal light of wavelength $\lambda_s$ from signal laser 24 to gain fiber 12. Signal laser 24 is modulated by a signal source 26, and the optical output of signal laser 24 is connected to coupler 20 at splice point 28. Optical fiber splices are represented by large dots in the drawings. Laser diode 22 is spliced to coupler 20 at splice point 30, and gain fiber 12 is spliced to coupler 20 at splice point 32. Gain fiber 12 is further spliced to fiber 34 at splice point 36.

The primary signal light can be perturbed at splice point 32 at the input end 14 of gain fiber 12 and a portion of the primary signal light be coupled from the fundamental mode of the primary signal light into one or more higher order modes as a secondary signal light. If not otherwise prevented, a portion of this secondary signal light may be re-coupled into the fundamental mode of the primary signal light while traversing fusion splice point 36 at the output end of gain fiber 12. The re-coupled secondary signal light then becomes a source of noise to the primary signal light.

In accordance with the present invention a bending means 38 is provided at the output end 16 of gain fiber 12 after first coil 18 and before splice point 36 for attenuating higher order modes. The optical characteristics of bending means 38 are such that it attenuates secondary signal light propagating within the higher order modes, and it propagates power in the fundamental mode of the primary signal light with very low loss. Thus, essentially all of the primary signal light is coupled into fiber 34, with minimal coupling of secondary signal light into the fundamental mode of the primary signal light at splice point 36. Output fiber 34 may be a transmission fiber, a coupler fiber, the input to a subsequent amplifier stage, or any other fiber, component or subunit designated to receive the primary signal light.

Figure 2:
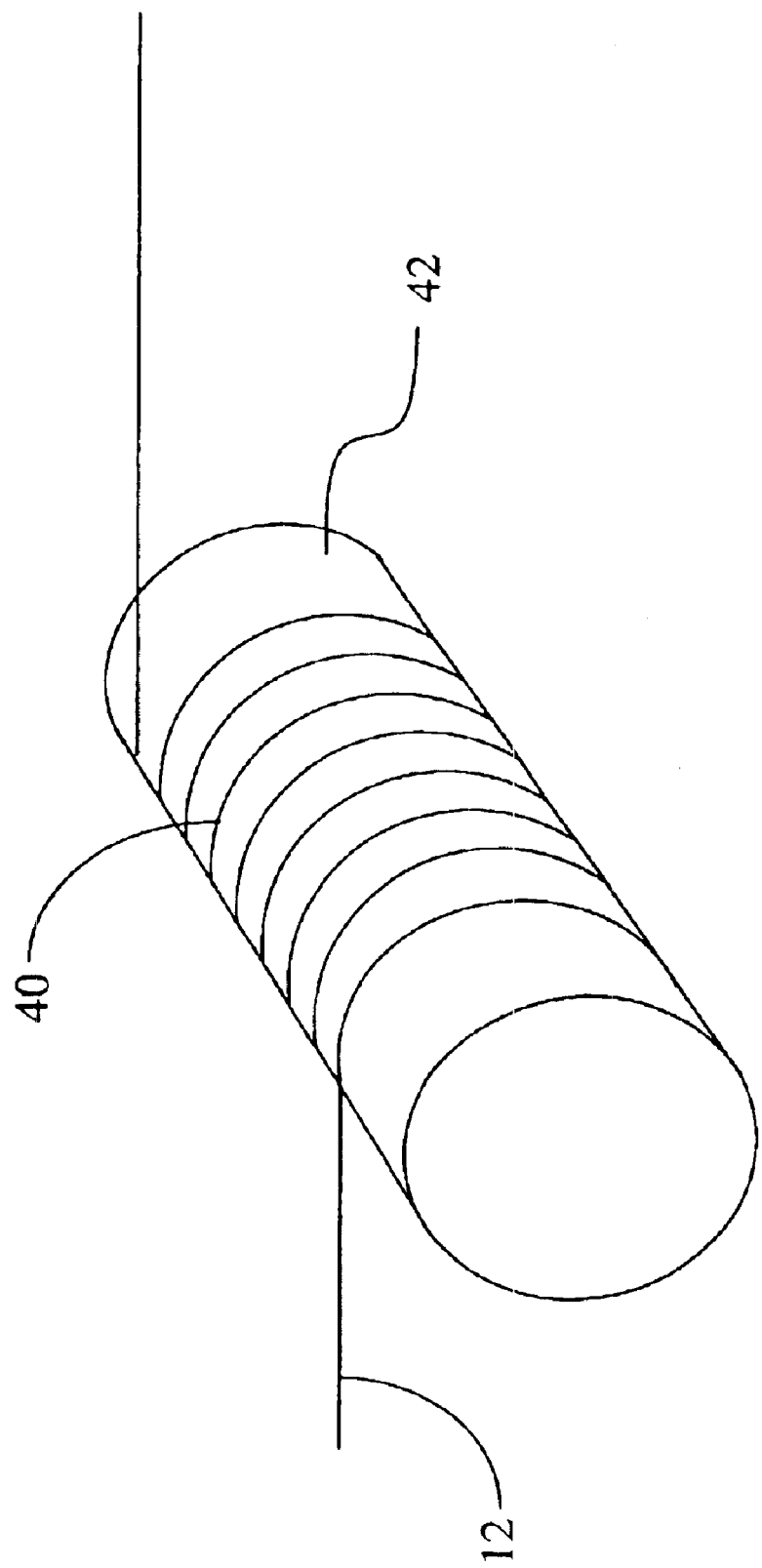
FIG. 2 is an illustration of one embodiment of the attenuating means.
Figure 3:
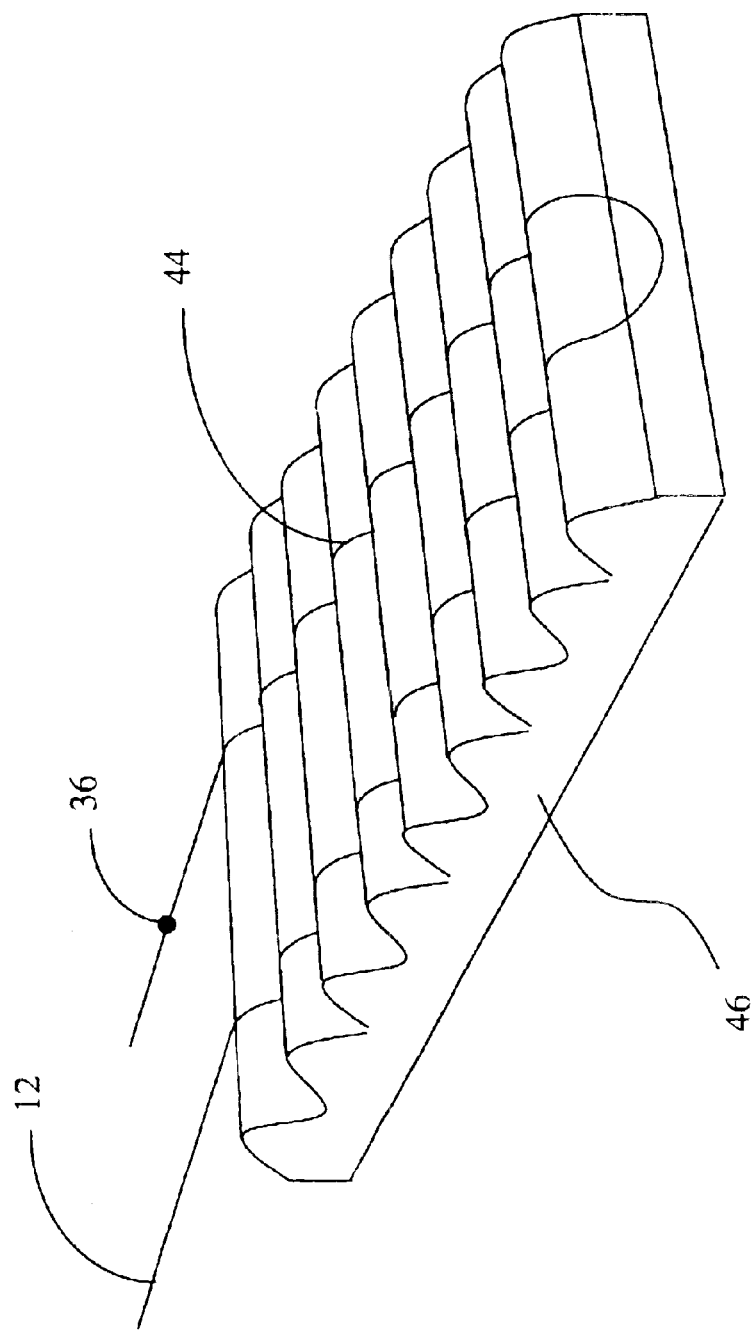
FIG. 3 is a second embodiment of the attenuating means.

Bend loss in optical fibers increases rapidly with mode number. As primary signal light is coupled into higher order modes, the bend loss associated with these higher order modes increases dramatically. Preferably, as shown in FIG. 3, the output end of gain fiber 12 after first coil 18 and before splice point 36 may be arranged, for example, in a series of bends 44, each of which bends is less than 360°, such bends being of a sufficient number and of a sufficiently small radius, depending upon the gain fiber bend characteristics, that the fiber bends pass the primary signal light with little loss, but substantially attenuate the secondary light propagating in higher order modes and thereby causing a reduction in noise amplitude in the output signal of the optical fiber module. Preferably, the reduction in noise amplitude is greater than about 20 dB, more preferably greater than about 25 dB. One way in which such a configuration may be achieved, for example, is to bond the output end of the gain fiber to a corrugated mount 46. However, other means of inducing bend loss are possible, and this embodiment should not be considered limiting in this respect. More preferably, the output end of gain fiber 12 after first coil 18 and before splice point 36 may be bent into a second coil 40, as shown in FIG. 2, optionally around a mandrel 42, having a sufficient number of turns of fiber, wherein the turns are of sufficiently small radius, depending upon the gain fiber bend loss characteristics, that the second coil passes the primary signal light and attenuates the secondary signal light that may be propagating in higher order modes and thereby causing a reduction in noise amplitude in the output signal of the optical fiber module. Preferably, the reduction in noise amplitude is greater than about 20 dB, more preferably greater than about 25 dB.

Figure 4:
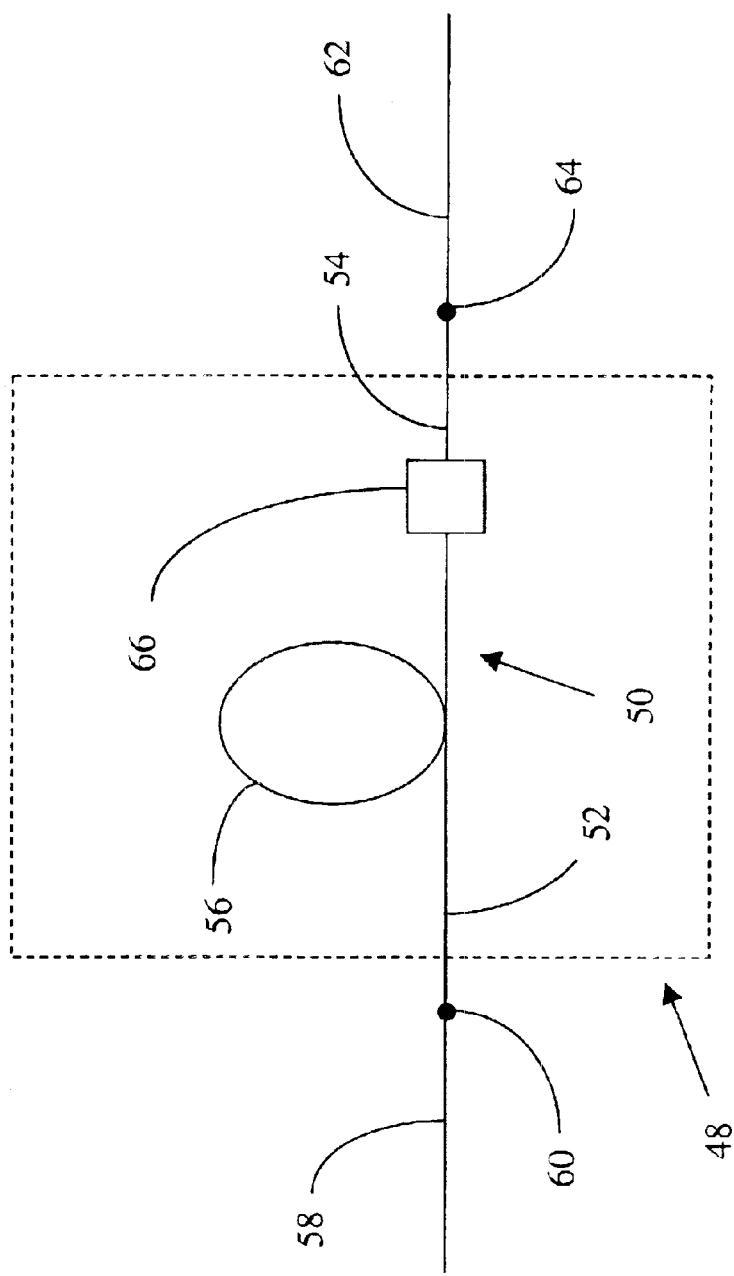
FIG. 4 is an illustration of an embodiment of the present invention showing the arrangement of the attenuating means in a dispersion compensating module.

In another embodiment, illustrated in FIG. 4, a dispersion compensating module is provided with a dispersion compensating fiber 50 having an input end 52 and an output end 54. The length of dispersion compensating fiber may be formed into a first coil 56 to facilitate placement of the compensating fiber within the module enclosure. Dispersion compensating fiber 50 is connected at its input end 52 to input fiber 58 at splice point 60, and to output fiber 62 at splice point 64. A primary signal light is input from input fiber 58 through splice point 60 into the input end 52 of dispersion compensating fiber 50. This primary signal light then exits the output end 54 of dispersion compensating fiber 50 through splice point 64 into output fiber 62. Depending upon the fiber cutoff wavelength of the dispersion compensating fiber, the perturbation to the primary signal light while traversing splice point 60 may be sufficient to couple light from the fundamental mode of the primary signal light into one or more higher order modes as secondary signal light. If not otherwise attenuated, the secondary signal light may be re-coupled into the fundamental mode of the primary signal light if the perturbation at splice point 64 is sufficiently large, thereby causing interference with the primary signal light. To eliminate the secondary signal light before re-coupling can occur, bending means are provided at the output end 54 of dispersion compensating fiber 50 after first coil 56 and before splice point 64 to attenuate higher order modes. Preferably, the output end 54 of dispersion compensating fiber 50 is arranged in a series of bends, each of which bends is less than 360°, such bends being of a sufficient number and of a sufficiently small radius, depending upon the gain fiber bend characteristics, that the fiber bends pass the primary signal light with little loss, but substantially attenuate the secondary light that has been coupled into higher order modes and thereby causing a reduction in noise amplitude in the output signal of the optical fiber module. Preferably, the reduction in noise amplitude is greater than about 20 dB, more preferably greater than about 25 dB. More preferably, bending means 66 is in the form of a second coil, optionally around a mandrel, having a sufficient number of turns of fiber, wherein the turns are of sufficiently small radius, depending upon the dispersion compensating fiber bend loss characteristics, that the second coil passes the primary signal light with little loss, but substantially attenuates the secondary signal light propagating in higher order modes and thereby causing a reduction in noise amplitude in the output signal of the optical fiber module. Preferably, the reduction in noise amplitude is greater than about 20 dB, more preferably greater than about 25 dB.

The bending means of the present invention is useful in various fiber amplifier gain modules or dispersion compensating modules. For example, the present invention is useful in multistage amplifier designs containing a plurality of individual components and sub-units wherein the bending means is deployed at the end of each gain fiber in each gain fiber sub-unit. Similarly, a dispersion compensating module may also contain a plurality of individual components and sub-units, each including at least one dispersion compensating fiber sub-unit. The present invention is deployed at the end of each dispersion compensating fiber in each dispersion compensating fiber sub-unit.

EXAMPLES

The invention will be further clarified by the following examples.

Example 1

Figure 5:
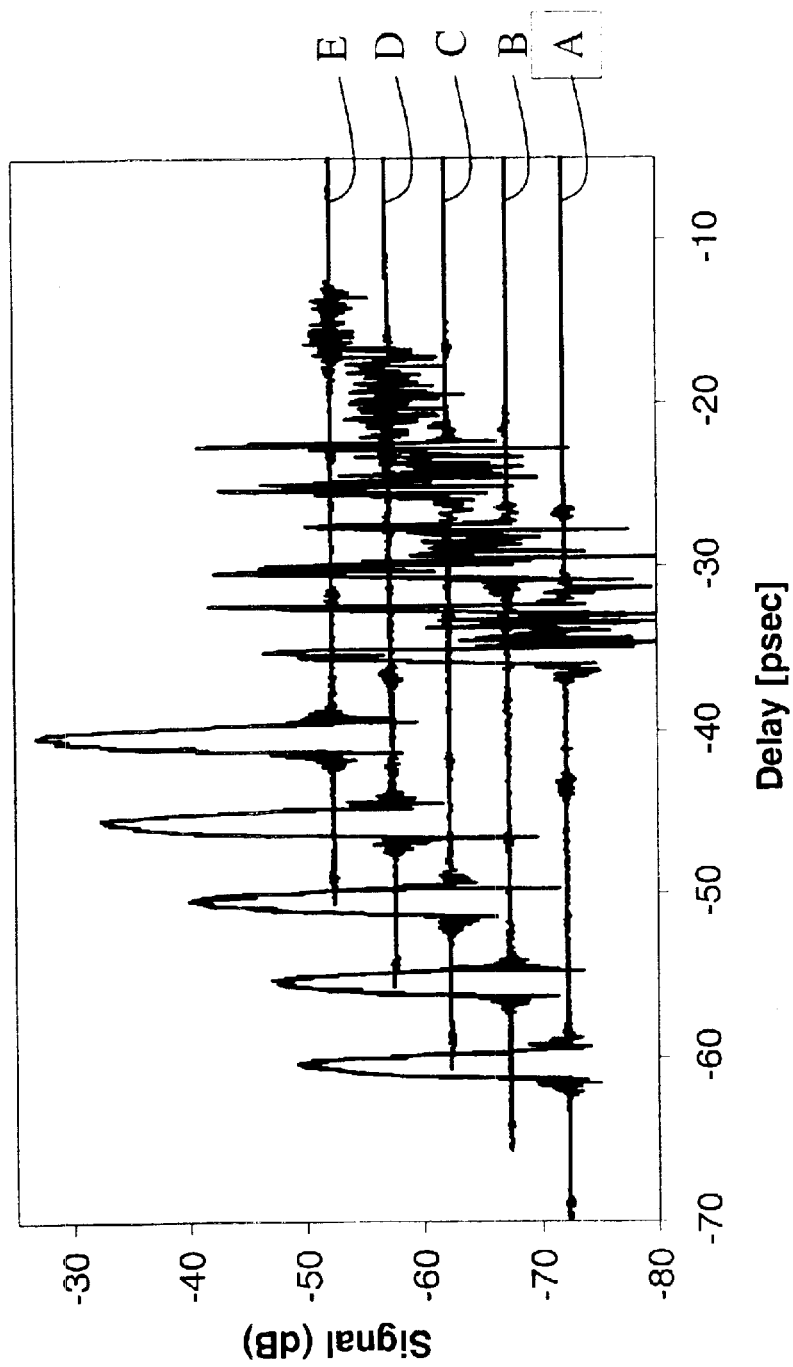
FIG. 5 is a plot of the output of a white light coherent detection interferometer showing the effects of coils of varying diameters on a length of dispersion compensating fiber experiencing MPI.

FIG. 5 illustrates the results of an experiment conducted with a 4 meter length of dispersion compensating fiber having a fiber cutoff wavelength greater than 1800 nm. A standard 1310 nm-optimized single-mode fiber (SMF-28™) was spliced to the input end of the dispersion compensating fiber to form a composite fiber. The composite fiber was deployed in an essentially straight configuration and redband amplified spontaneous emission from an erbium optical amplifier was input into the input end of the standard single-mode fiber. A white light coherent detection interferometer was used to measure the optical power at the output end of the dispersion compensating fiber. In this experiment the interferometer delay was varied to show the different propagating modes of the fiber at unique delays. Next, a coil consisting of a single turn of the dispersion compensating fiber was wound around a series of mandrels of varying diameter to determine the optimal diameter required to eliminate higher order modes. A first coil was formed around a first mandrel and a measurement was taken. The first coil was then replaced with a second coil having a different diameter and a measurement taken, and so forth. In all cases a single turn was used and a measurement taken for each diameter. FIG. 5 shows a series of plots in which the diameter varies from a coil of infinite diameter (no coil) at the bottom of the chart (curve A), through a sequence of 6 cm (curve B), 5 cm (curve C), 4 cm (curve D), and finally a 3 cm diameter coil at the top of the chart (curve E). As seen in FIG. 5, for the fiber of this example a coil diameter of between 3 cm to 4 cm was sufficient to eliminate modal interference. This was determined by comparing the peak noise amplitude of curve A in FIG. 5, where curve A has a peak noise amplitude of approximately 30 dB, to the peak amplitude of curve D, where the peak amplitude of curve D is approximately 10 dB, a decrease in noise through radiation of approximately 20 dB. The portion of the family of curves representing noise is the high-frequency waveform to the right of each of curves A through E and shown here having a delay of approximately 25 psec from the primary signal light shown at the left of each curve. Similarly, The peak noise amplitude of curve A can be compared to the peak noise amplitude of curve E, where the peak noise amplitude of curve E is approximately 3 dB, a decrease in noise amplitude through radiation of approximately 27 dB.

Example 2

Figure 6:
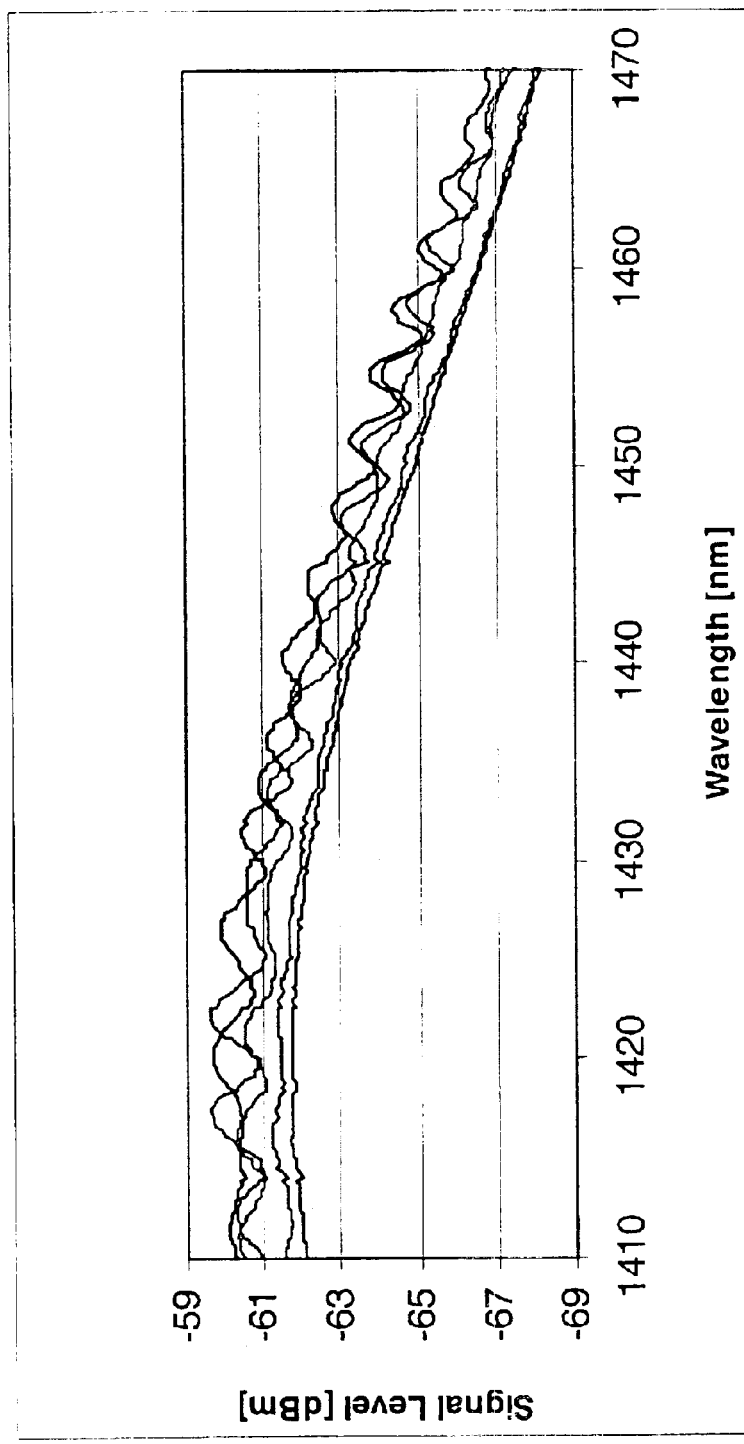
FIG. 6 is a plot of the output of a spectrum analyzer showing the effects of coils of varying diameter on a length of dispersion compensating fiber experiencing MPI.

A length of standard 1310 nm-optimized single-mode fiber (Corning SMF-28™ fiber) was spliced to each of the input end and the output end of a length of dispersion compensating fiber to form a composite fiber. The dispersion compensating fiber was cut from the same spool of fiber from which the dispersion compensating fiber in example 1 originated. The dispersion compensating fiber had a cutoff wavelength greater than 1800 nm and a total length of 186 cm. The splice between the first length of standard single-mode fiber and the input end of the dispersion compensating fiber was intentionally offset to ensure sufficient coupling or optical power into higher order modes. The composite fiber was first deployed in an essentially straight baseline configuration and a broadband light from a 1400 nm edge-emitting LED having a spectral width of approximately 50 nm was launched into the input end of the composite fiber. The light exiting the output end of the composite fiber was collected by an optical spectrum analyzer. The results of these measurements are shown in FIG. 6. Modal interference can be observed as oscillations in the signal intensity versus wavelength in FIG. 6. A coil consisting of a single turn of varying diameters was then placed in the dispersion compensating fiber under test and the results for each diameter measured by the spectrum analyzer. In FIG. 6, the top three very wavy traces represent coil diameters of 5 cm, 6 cm, and the baseline measurement in an essentially straight configuration (an infinite loop diameter). The essentially smooth curves at the bottom of the chart represent coil diameters of 3 cm and 4 cm. As shown, modal interference was eliminated as the diameter of the coil was reduced to a diameter of between 3 cm and 4 cm. Although only a single turn was required to eliminate modal interference in this experiment, it should be recognized that other fiber designs may require multiple turns of the specialty fiber and that a different coil diameter may be required for the elimination of modal interference to be equally effective to the results obtained with the dispersion compensating fiber of this experiment.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

What is claimed is:

1. An optical fiber module comprising:
   at least one optical fiber, said at least one optical fiber having an input end, an output end, a first coil, and at least one additional bend separate from said first coil and positioned between said first coil and said output end for attenuating higher order modes.

2. The optical fiber module of claim 1 wherein said at least one optical fiber is an optical amplifier gain fiber.

3. The optical fiber module of claim 1 wherein said at least one optical fiber is a dispersion compensating fiber.

4. The optical fiber module of claim 1 wherein said additional bend comprises a second coil, a diameter of said second coil, and a number of turns in said second coil, being sufficient to cause a reduction in peak noise amplitude of an output signal of said optical fiber module greater than about 20 dB.

5. The optical fiber module of claim 4 wherein said second coil results in a reduction in peak noise amplitude of greater than about 25 dB.

6. The optical fiber module of claim 4 wherein the diameter of said second coil is less than about 4 cm.

7. The optical fiber module of claim 4 wherein the diameter of said second coil is less than about 3 cm.

8. The optical fiber module of claim 6 or claim 7 wherein said second coil is comprised of a single turn.

9. The optical fiber module of claim 4 wherein said second coil is disposed about a mandrel.

10. The optical fiber module of claim 1 wherein said at least one additional bend comprises a series of bends, each bend of said series of bends being less than 360 degrees, a radius of said bends, and a number of said bends, being sufficient to cause a reduction in peak noise amplitude of an output signal of said optical fiber module greater than about 20 dB.

11. The optical fiber module of claim 10 wherein said series of bends results in a reduction in peak noise amplitude of greater than about 25 dB.

12. The optical fiber module of claim 10 wherein said series of bends is formed by conforming said optical fiber to a corrugated mount.

13. An optical fiber module comprising:
   an optical fiber having an input end, an output end, and a first coil;
   at least one additional bend in said optical fiber separate from said first coil and positioned between said first coil and said output end for attenuating higher order modes; and
   bending means for forming said at least one additional bend.

14. An optical fiber module comprising:
   a dispersion compensating optical fiber having an input end, an output end and a first coil;
   a second coil in said dispersion compensating optical fiber separate from said first coil and positioned between said first coil and said output end for attenuating higher order modes, said second coil having a single turn with a diameter less than 4 cm.

* * * * *